US006767417B2

(12) United States Patent
Fujita et al.

(10) Patent No.: US 6,767,417 B2
(45) Date of Patent: Jul. 27, 2004

(54) STEEL SHEET AND METHOD FOR MANUFACTURING THE SAME

(75) Inventors: Takeshi Fujita, Fukuyama (JP);
Kenichi Mitsuzuka, Fukuyama (JP);
Nobuyuki Nakamura, Fukuyama (JP);
Toshiaki Urabe, Fukuyama (JP);
Katsutoshi Ito, Fukuyama (JP);
Hideyuki Tsurumaru, Fukuyama (JP)

(73) Assignee: NKK Corporation, Tokyo (JP)

( * ) Notice: Subject to any disclaimer, the term of this patent is extended or adjusted under 35 U.S.C. 154(b) by 112 days.

(21) Appl. No.: 10/255,349

(22) Filed: Sep. 26, 2002

(65) Prior Publication Data

US 2003/0121576 A1 Jul. 3, 2003

Related U.S. Application Data

(63) Continuation of application No. PCT/JP02/00915, filed on Feb. 5, 2002.

(30) Foreign Application Priority Data

| Feb. 7, 2001 | (JP) | 2001-030354 |
| Feb. 7, 2001 | (JP) | 2001-030355 |
| Sep. 5, 2001 | (JP) | 2001-268315 |
| Sep. 5, 2001 | (JP) | 2001-268316 |

(51) Int. Cl.[7] .................. C22C 38/14; C22C 38/06; C21D 8/02
(52) U.S. Cl. .................. 148/330; 148/601; 148/603
(58) Field of Search ................. 148/330, 320, 148/601, 603

(56) References Cited

U.S. PATENT DOCUMENTS 4,397,699 A * 8/1983 Takahashi et al. .......... 148/603

5,558,726 A * 9/1996 Yatoh et al. ............... 148/328

FOREIGN PATENT DOCUMENTS

| JP | 60-238424 A | 11/1985 |
| JP | 7-126807 A | 5/1995 |
| JP | 8-269615 A | 10/1996 |
| JP | 11-61272 A | 3/1999 |
| JP | 2000-144319 A | 5/2000 |
| JP | 2002-60849 A | 2/2002 |

OTHER PUBLICATIONS

Shibata et al, "A Method to Induction–harden Sheet Steel Parts of Automobile Body for Achieving Occupant Safety in Collision, Weight Reduction, and Cost Saving", *MATERIA*, vol. 37, No. 6, The Japan Institute of Metals (Jun. 1998).

* cited by examiner

Primary Examiner—Deborah Yee
(74) Attorney, Agent, or Firm—Frishauf, Holtz, Goodman & Chick, P.C.

(57) ABSTRACT

The present invention relates to a steel sheet that consists essentially of 0.10 to 0.37% C, 1% or less Si, 2.5% or less Mn, 0.1% or less P, 0.03% or less S, 0.01 to 0.1% sol.Al, 0.0005 to 0.0050% N, 0.0003 to 0.0050% B, by mass, and balance of Fe, [14B/(10.8N)] being 0.5 or more, average particle size of precipitate BN being 0.1 $\mu$m or more, and grain size of prior austenite after the hardening treatment being 2 to 25 $\mu$m. The steel sheet according to the present invention allows an inexpensive hardening treatment method to be applied to improve the strength to a level required for the structural components and the functional components of automobiles, while providing excellent toughness after the hardening treatment.

24 Claims, 5 Drawing Sheets

US 6,767,417 B2

STEEL SHEET AND METHOD FOR MANUFACTURING THE SAME

This application is a continuation application of International Application PCT/JP02/00915 (not published in English) filed Feb. 5, 2002.

BACKGROUND OF THE INVENTION

1. Field of the Invention

The present invention relates to a steel sheet used for structural components and functional components of automobiles, particularly to a steel sheet that provides high strength and superior toughness by applying hardening treatment thereto after forming thereof to component shapes, and also relates to a method for manufacturing the same.

2. Description of Related Arts

High strength steel sheets having a strength of 980 MPa or more are currently applied to structural components of automobiles, including door impact beams and center pillars, taking advantages of light weight and durability thereof. These steel sheets are also used as functional components of automobiles, including gear parts for seat recliners and window regulators, owing to the excellent wear resistance.

Those components require, however, sever formability, so the current steel sheets often raise problems of cracks and imprecision of dimension. Furthermore, those types of steel sheets are expensive as base materials.

With that kind of problems, there have been trials in recent years to use steel sheets having 440 MPa level strength for further increasing the strength thereof by applying heat treatment such as induction hardening treatment after formed to respective components. For example, [MATERIA, vol.37, No.6 (1998)] discloses an example of strengthening steel sheets having 440 and 390 MPa of original strength, respectively, by forming them to center pillar re-enforcement and to front cross member, followed by applying induction hardening treatment. The disclosure proposes a method of induction hardening treatment, in which a heating coil supported by a robot is moved precisely along the profile of the component to minimize the variations in hardening treatment conditions.

JP-A-60-238424 and JP-A-7-126807, (the term "JP-A" referred herein signifies the "Unexamined Japanese Patent Publication"), disclose a method for increasing the strength, in which the hardening treatment is conducted by irradiating high energy density beam such as laser to a formed component.

According to the method disclosed in [MATERIA, vol.37, No.6 (1998)], however, a specially designed robot is required to decrease the variations in the hardening treatment conditions, which induces significant increase in the investment cost.

According to the method disclosed in JP-A-60-238424 and JP-A-7-126807, the zone of irradiation of high energy density beam is narrow, and a long time is required to strengthen the total target component, which significantly degrades the productivity and increases the investment cost. The steel sheets receiving those kinds of treatment give around 710 MPa of strength, at the highest, after hardening treatment, and also give not sufficient toughness. Therefore, these steel sheets cannot be applied to the structural components such as door impact beams and center pillars, and to the functional components such as gear parts used in seat recliners and window regulators, all of which require strengths of 980 MPa or more.

SUMMARY OF THE INVENTION

An object of the present invention is to provide a steel sheet that increases the strength to a level necessary for structural components and functional components of automobiles by applying an inexpensive hardening treatment method, while giving excellent toughness after hardening treatment, and to provide a method for manufacturing the same.

The object is attained by a steel sheet that consists essentially of 0.10 to 0.37% C, 1% or less Si, 2.5% or less Mn, 0.1% or less P, 0.03% or less S, 0.01 to 0.1% sol.Al, 0.0005 to 0.0050% N, 0.0003 to 0.0050% B, by mass, and balance of Fe, [14B/(10.8N)] being 0.5 or more, average particle size of precipitate BN being 0.1 $\mu$m or more, and grain size of prior austenite after hardening treatment being 2 to 25 $\mu$m.

The above-described object is attained also by a steel sheet, further adding Ti to the composition of the above-described steel sheet, which consists essentially of 0.10 to 0.37% C, 1% or less Si, 2.5% or less Mn, 0.1% or less P, 0.03% or less S, 0.01 to 0.1% sol.Al, 0.0005 to 0.0050% N, 0.005 to 0.05% Ti, 0.0003 to 0.0050% B, by mass, and balance of Fe, [B−(10.8/14)N*] being not less than 0.0005%, average particle size of precipitate TiN being 0.06 to 0.30 $\mu$m; grain size of prior austenite after hardening treatment being 2 to 25 $\mu$m, N* being set to zero for negative N* values calculated in a definition formula of N*=[N−(14/48)Ti].

These steel sheets can be manufactured by a method for manufacturing a steel sheet, which has the steps of: hot rolling a steel slab consisting essentially of 0.10 to 0.37% C, 1% or less Si, 2.5% or less Mn, 0.1% or less P, 0.03% or less S, 0.01 to 0.1% sol.Al, 0.0005 to 0.0050% N, 0.0003 to 0.0050% B, by mass, and balance of Fe, [14B/(10.8N)] being 0.5 or more, or essentially of 0.10 to 0.37% C, 1% or less Si, 2.5% or less Mn, 0.1% or less P, 0.03% or less S, 0.01 to 0.1% sol.Al, 0.0005 to 0.0050% N, 0.005 to 0.05% Ti, 0.0003 to 0.0050% B, by mass, and balance of Fe, [B−(10.8/14)N*]] being not less than 0.0005%, at temperatures of Ar3 transformation point or above; and coiling thus hot rolled steel sheet at temperatures of 500 to 720° C.

DETAILED DESCRIPTION OF THE INVENTION

Figure 1:
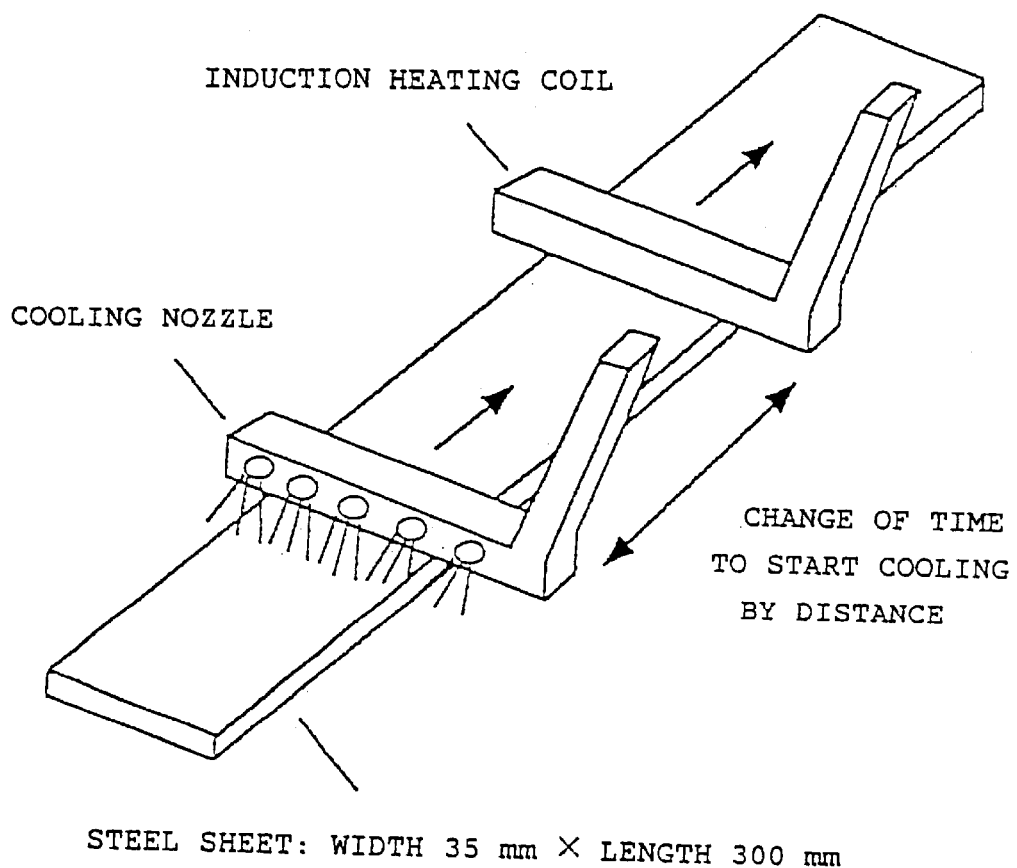
FIG. 1 illustrates a method for induction hardening treatment.

The inventors of the present invention investigated the steel sheets that allow to provide high strength and excellent toughness by an inexpensive method for hardening treatment, and derived the following-described findings.

i) Addition of C and B is essential to surely increase the strength of formed components to a necessary level thereof at heating temperatures of hardening treatment of 1,0000° C. or below, particularly 950° C. or below.

ii) The toughness after the hardening treatment is significantly influenced by the particle size of precipitates and the microstructure. In particular, the particle size of precipitates BN and TiN varies the size of austenite grains during heating in the hardening treatment, so the toughness after the hardening treatment depends on the particle size. That is, when BN finely deposits, the BN dissolves during heating in the hardening treatment to significantly enlarge the austenite grain size. When TiN finely deposits, the austenite grain size becomes significantly small during heating in the hardening treatment, and ferrite grains are generated in part during cooling step. As a result, the toughness decreases.

iii) Regarding the time-variations in the period of from the end of induction heating to the start of cooling, the influence of [14B/(10.8N)], or of [B−(10.8/14)N*] for the case of Ti addition, is significant. If these values are small, the ferrite grains are generated during the cooling step, as in the case of ii), thus reducing the toughness. The N* is defined by the formula of [N−(14/48)Ti], and N*=0 if the calculated value of N* is negative.

The present invention was conducted on the basis of the above-described findings. The detail of the present invention is described below.

1) Steel composition

The steel sheet according to the present invention consists essentially of the elements described below and balance of Fe.

C: Carbon is an important element to attain high strength after hardening treatment. To obtain 980 MPa or higher strength, at least 0.10% of C content is necessary. If, however, the C content exceeds 0.37%, the toughness significantly decreases. Therefore, the C content is specified to a range of from 0.10 to 0.37%. For attaining higher strength and further superior toughness, the C content is preferably regulated to a range of from 0.15 to 0.30%.

Si: Silicon is an element to improve hardenability and also to increase the strength through solid solution strengthening. If, however, the Si content exceeds 1%, a band structure which is a segregation zone is formed in a hot rolled steel sheet, so the toughness degrades. Consequently, the Si content is specified to 1% or less. For attaining further superior toughness, the Si content is preferably regulated to 0.5% or less. For attaining extremely superior toughness, the Si content is preferably regulated to less than 0.15%.

Mn: Manganese is an element to improve the hardenability and also to increase the strength through solid solution strengthening. If, however, the Mn content exceeds 2.5%, the formation of segregation zone becomes significant, so the toughness degrades. Accordingly, the Mn content is specified to 2.5% or less. For attaining further superior toughness, the Mn content is preferably regulated to 1.5% or less.

P: Phosphorus is an element to improve the hardenability and to increase the strength through solid solution strengthening. Phosphorus is also an element that segregates in grain boundaries to decrease the toughness. Addition of B suppresses the segregation of P in grain boundaries. If, however, the P content exceeds 0.1%, the grain boundary brittleness is induced to degrade the toughness. Consequently, the P content is specified to 0.1% or less. For attaining further superior toughness, the P content is preferably regulated to 0.05% or less.

S: Sulfur is an element to be decreased in content thereof because S forms sulfides to degrade the toughness. In particular, when S content exceeds 0.03%, the toughness significantly degrades. Therefore, the S content is specified to 0.03% or less. For attaining further superior toughness, the S content is preferably regulated to 0.02% or less.

sol.Al: Soluble Aluminum is an element that is used as a deoxidizing agent to improve the cleanliness of steel. If, however, the content of sol.Al is less than 0.01%, the cleanliness is degraded, and the inclusions increase, thus degrading the toughness. If the content of sol.Al exceeds 0.1%, the formation of AlN becomes significant, and the size of austenite grains becomes small during heating in the hardening treatment, and ferrite grains are generated during cooling step, thus degrading the toughness. Therefore, the content of sol.Al is specified to a range of from 0.01 to 0.1%. For attaining further superior toughness, the content of sol.Al is preferably regulated to a range of from 0.03 to 0.07%.

N: Nitrogen is an important element for forming BN, or TiN for the case of Ti addition, and suppressing the growth of austenite grains during heating in hardening treatment, thus improving the toughness. At least 0.0005% of the N content is necessary. If the N content exceeds 0.0050%, the formation of not only BN and TiN but also AlN becomes significant, further the austenite grains are refined during heating in the hardening treatment, and ferrite grains are generated during cooling step, thus degrading the toughness. Consequently, the N content is specified to a range of from 0.0005 to 0.0050%.

B: Boron is an important element that increases the hardenability and that suppresses coarsening of austenite grains during heating in the hardening treatment by depositing as BN, and suppresses formation of ferrite grains in the case of Ti addition, thus improving the toughness. If, however, the B content is less than 0.0003%, sufficient effect thereof cannot be attained. If the B content exceeds 0.0050%, the load on the hot rolling mill increases to degrade the operability, and the formability of steel sheet is also degraded. Consequently, the B content is specified to a range of from 0.0003 to 0.0050%. For attaining further superior toughness, the B content is preferably regulated to a range of from 0.0010 to 0.0030%.

For the case of Ti addition, in addition to the above-described elements, the Ti content is regulated as follows.

Ti: Titanium is an important element that forms TiN with nitrogen to suppress the coarsening of austenite grains during heating in the hardening treatment, thus improving the toughness. If, however, the Ti content is less than 0.005%, sufficient effect thereof cannot be attained. If the Ti content exceeds 0.05%, the formation of TiC becomes significant, and the growth of austenite grains is significantly suppressed during heating in the hardening treatment, and ferrite grains are formed during cooling step after the heating, thus degrading the toughness. Therefore, the Ti content is specified to a range of from 0.005 to 0.05%.

Adding to the above-described elements, addition of chromium further improves the hardenability without degrading the formability. If the Cr content is less than 0.05%, the effect of improving hardenability is less. If the Cr content exceeds 0.30%, the cost increases. So the Cr content is specified to a range of from 0.05 to 0.30%.

In addition, if at least one element selected from the group consisting of Ni and Mo is further added, more excellent hardenability is attained. Excessive addition of Ni and/or Mo, however, increases the cost, so the amount of their addition is limited to 1% or less.

To suppress the coarsening of austenite grains during heating in the hardening treatment, Nb or V may be added to 0.1% or lower. To improve the ductility, Ca may be added to 0.01% or less. To improve the corrosion resistance, Cu may be added to less than 1%.

2) [14B/(10.8N)] and [B−(10.8/14)N*]

Adding to the control of above-described elements, it is necessary to control the value of [14B/(10.8N)] for the case of no Ti addition, and the value of [B−(10.8/14)N*] for the case of Ti addition, to assure stably superior toughness against variations of hardening treatment conditions.

2.1) [14B/(10.8N)]

A steel having composition of 0.16% C, 0.01% Si, 0.75% Mn, 0.015% P, 0.012% S, 0.040% sol.Al, 0.0020 to 0.0028% N, 0.0003 to 0.0028% B, and [14B/(10.8N)] of 0.19 to 1.30 was prepared by melting. Cold rolled steel sheets having 1.2 mm in thickness were produced in the following conditions. The hot rolling condition was: 1,200° C. of heating temperature, 880° C. of finishing temperature, 710° C. of intermediate temperature (temperature at center part of the runout table), and 640° C. of coiling temperature. The hot rolled steel sheets were pickled, and then cold rolled at a reduction rate of 50%. The cold rolled steel sheets were annealed at 700° C. for 2 minutes. After applying induction hardening treatment, the toughness of thus prepared steel sheets was determined.

Figure 2:
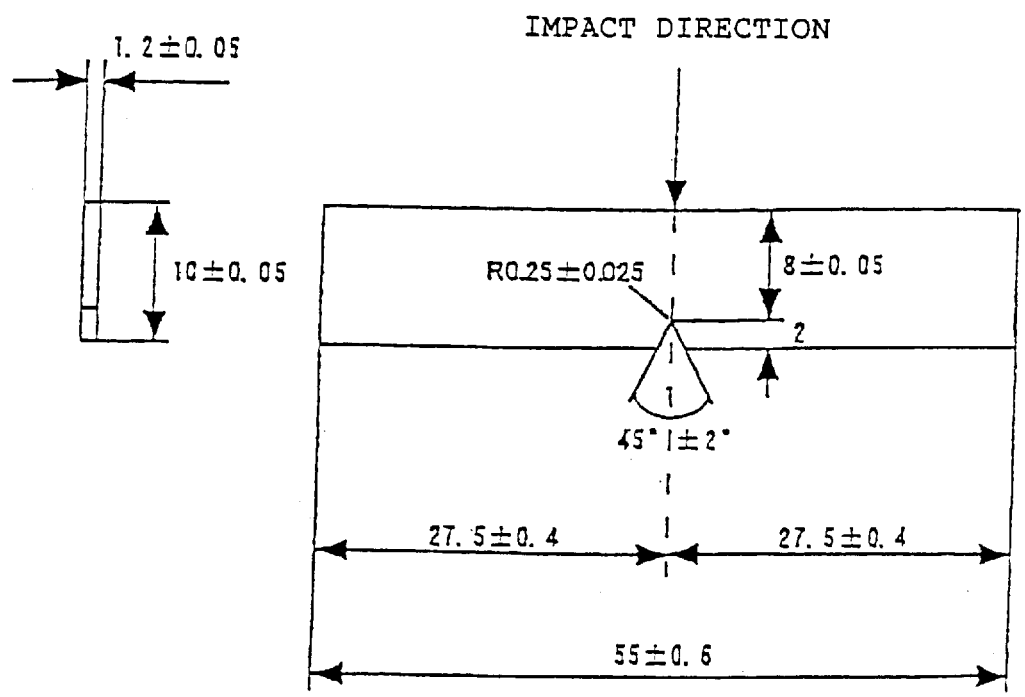
FIG. 2 shows a specimen used in Charpy impact test.

FIG. 1 illustrates a method of induction hardening treatment. That is, the steel sheet having 35 mm in width and 300 mm in length was heated to 900° C. within 4 seconds while letting an induction coil move thereabove, then was cooled by water using a cooling nozzle, changing the time to start cooling in three kinds, 0.5 seconds (normally applied level), 1.5 seconds, and 3 seconds. The Charpy impact test was given at −50° C. on specimens shown in FIG. 2 to determine the absorbed energy. The absorbed energy was calculated by averaging the results of three times of Charpy impact tests.

Figure 3:
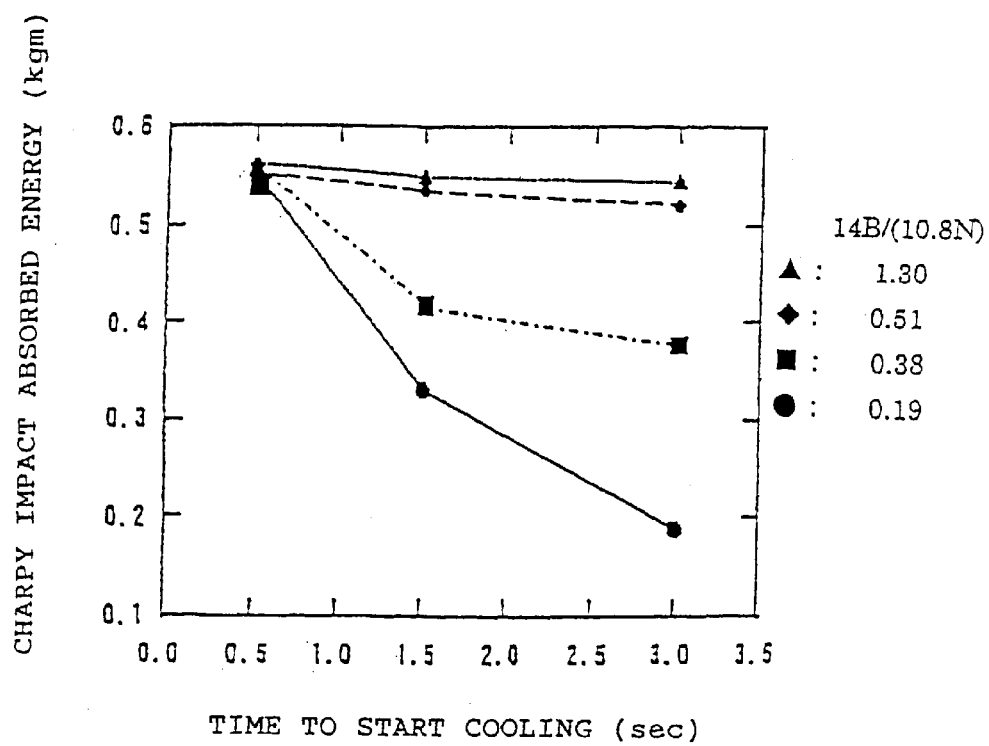
FIG. 3 is a graph showing the relation between the Charpy impact absorbed energy, the time to start cooling, and the value of [14B/(10.8N)].

FIG. 3 shows the relation between the Charpy impact absorbed energy, the time to start cooling, and the value of [14B/(10.8N)].

For the value of [14B/(10.8N)] being 0.5 or more, high Charpy impact absorbed energy is stably attained even at 3 seconds of the time to start cooling. If the value of [14B/(10.8N)] is less than 0.5, however, sufficient amount of solid solution B cannot be assured during heating in the hardening treatment, and, if the time to start cooling delays, the ferrite grains are formed to decrease the toughness. Consequently, to attain stably high toughness, the value of [14B/(10.8N)] is specified to 0.5 or more.

2.2) [B−(10.8/14)N*]

For the case of Ti addition, the effective solid solution B gives significant influence on the variations in hardening treatment conditions. A steel having composition of 0.15% C, 0.02% Si, 0.90% Mn, 0.020% P, 0.015% S, 0.035% sol.Al, 0.01% Ti, 0.0018 to 0.0030% N, 0 to 0.0031% B, and [B−(10.8/14)N*] of 0 to 0.0017% was prepared by melting. Cold rolled steel sheets having 1.2 mm in thickness were produced in the following conditions. The hot rolling condition was: 1,200° C. of heating temperature, 870° C. of finishing temperature, 700° C. of intermediate temperature, and 620° C. of coiling temperature. The hot rolled steel sheets were pickled, and then cold rolled at a reduction rate of 50%. The cold rolled steel sheets were annealed at 720° C. for 2 minutes. After applying induction hardening treatment, the toughness of thus prepared steel sheets was determined using the same procedure described above.

Figure 4:
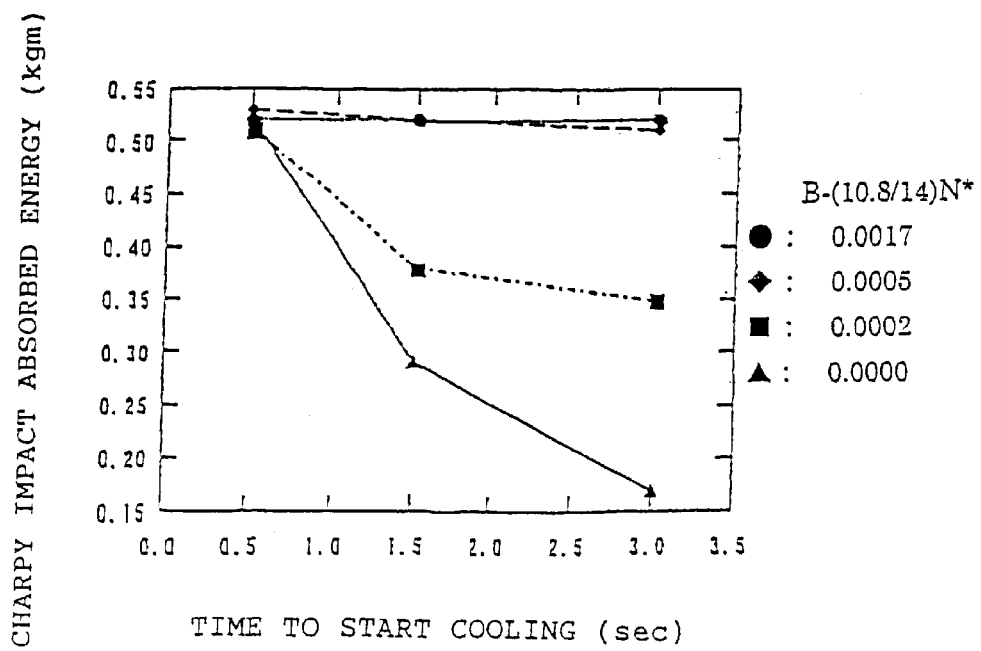
FIG. 4 is a graph showing the relation between the Charpy impact absorbed energy, the time to start cooling, and the value of [B−(10.8/14)N*].

FIG. 4 shows the relation between the Charpy impact absorbed energy, the time to start cooling, and the value of [B−(10.8/14)N*].

For the value of [B−(10.8/14)N*] being 0.0005% or more, high Charpy impact absorbed energy is stably attained even at 3 seconds of the time to start cooling. If the value of [B−(10.8/14)N*] is less than 0.0005%, however, sufficient amount of solid solution B cannot be assured during heating in the hardening treatment, and, if the time to start cooling delays, the ferrite grains are formed to decrease the toughness. Consequently, to stably attain high toughness, the value of [B−(10.8/14)N*] is specified to 0.0005% or more.

3) BN and TiN

Furthermore, for controlling the size of austenite grains during heating in the hardening treatment, it is necessary to control the size of BN for a steel without Ti addition, and of TiN for a steel with Ti addition.

3.1) BN

If the average particle size of BN is smaller than 0.1 μm, heating of steel to 900° C. or above results in BN dissolving, thus failing in suppressing the growth of austenite grains. As a result, the austenite grains become coarse during heating in the hardening treatment to degrade the toughness. Therefore, the average particle size of BN is specified to 0.1 μm or larger. From the point of toughness, 1 μm or smaller is preferable.

3.2) TiN

If the average particle size of TiN is smaller than 0.06 μm, the austenite grains become very fine during heating in the hardening treatment, and ferrite grains are formed during cooling step to degrade the toughness. If the average particle size of TiN exceeds 0.30 μm, similar to the case of BN, the growth of austenite grains during heating in the hardening treatment cannot be suppressed, and the toughness degrades. Consequently, the average particle size of TiN is specified to a range of from 0.06 to 0.30 μm.

4) Size of prior austenite grains

Both in the cases of without addition of Ti and of addition of Ti, the size of prior austenite grains after the hardening treatment, or the size of prior austenite grains before transformation measured after the hardening treatment, gives significant influence on the toughness. If the size of prior austenite grains is smaller than 2 μm, ferrite grains are formed in part during cooling step after heating, which induces stress intensification at boundary of ferrite grain and austenite grain, thus degrading the toughness. If the size of prior austenite grains exceeds 25 μm, the grain boundary brittleness becomes significant, and the toughness decreases from the level specified in a conventional standard JSC980Y. Accordingly, the size of prior austenite grains after the hardening treatment is specified to a range of from 2 to 25 μm.

The size of prior austenite grains was observed using a light microscope and measured by a microanalyzer, after polished and corroded on a section of steel sheet. The measured size was an averaged size.

5) Surface roughness of steel sheet

From the point of hardenability, the surface roughness of steel sheet is preferably regulated to 0.40 μm or more for Ra (arithmetic mean) and 12.0 μm or less for Ry (maximum height). The values of Ra and Ry are averaged values of measured ones in the rolling direction and in the direction lateral to the rolling direction, respectively, conforming to JIS B0601.

If Ra is 0.40 μm or more, the surface area is large, so a short time heating by the induction heating performs sufficient heating, thus further improves the hardenability. If, however, Ra exceeds 1.6 μm, the toughness degrades in some cases. Therefore, the Ra is preferably regulated to 1.6 μm or less.

If Ry exceeds 12.0 μm, the toughness may be degraded by the notch effect. So the Ry is preferably regulated to 12.0 μm or less. If the Ry is less than 2.0 μm, the surface roughness becomes small, which may induce degradation of the hardenability. So the Ry is preferably regulated to 2.0 μm or more.

6) Manufacturing method

The above-described steel sheets can be manufactured by, for example, the method comprising the steps of: hot rolling a steel slab that satisfies the conditions relating to the above-described composition at temperatures of Ar3 transformation point or above; and coiling thus hot rolled steel sheet at temperatures of from 500 to 720° C. The steel sheet manufactured by the method is a hot rolled steel sheet. The hot rolling is necessary to be conducted at temperatures of Ar3 transformation point or above to attain homogeneous structure. Regarding the coiling temperature, above 720° C. results in wide gap between pearlite lamellae, which degrades the hardenability, and further the cementite is left undissolved during the hardening treatment to degrade the toughness. Therefore, the coiling temperature is specified to 720° C. or below, preferably 700° C. or below. If the coiling temperature is below 500° C., very fine BN and TiN are formed. In that case, BN dissolves and austenite grains become coarse during heating in the hardening treatment, and fine TiN makes the austenite grains very fine, thus forming ferrite grains during cooling step, degrading the toughness. Consequently, the coiling temperature is specified to 500° C. or above, preferably to 580° C. or above.

The temperature of steel sheet at the center part of a runout table, on which the hot rolled steel sheet travels before being coiled, is called the "intermediate temperature". The intermediate temperature is preferably regulated to 750° C. or below to surely suppress the formation of ferrite grains, and is preferably regulated to 560° C. or above to surely suppress the formation of fine BN and TiN.

When a hot rolled steel sheet is pickled and annealed, the cementite is spheroidized to give further excellent workability and hardenability to the hot rolled steel sheet. If the temperature of annealing is below 640° C., the spheroidization of cementite becomes insufficient. When the annealing temperature exceeds the Ac1 transformation point, the structure is partially austenitized, and coarse pearlite appears during cooling step. The insufficient spheroidization and the coarse pearlite degrade the workability and hardenability, and the cementite is left undissolved during the hardening treatment to degrade the toughness. Therefore, the annealing temperature is specified to a range of from 640° C. to Ac1 transformation point.

After picking, when a hot rolled steel sheet is cold rolled at a reduction rate of 30% or higher, followed by annealing at temperatures of from 640° C. to Ac1 transformation point, the obtained cold rolled steel sheet has excellent workability and hardenability. If the reduction rate is less than 30%, non-crystallized portion is left after annealing, and the spheroidization of cementite becomes insufficient. So the reduction rate is specified to 30% or more. The upper limit of the reduction rate is not specifically limited. However, the reduction rate is preferably regulated to 80% or less to prevent increase in the load on the rolling mill.

When a hot rolled steel sheet is annealed at temperatures of from 640° C. to Ac1 transformation temperature after pickling, cold rolled at a reduction rate of 30% or higher, and annealed at temperatures of from 600° C. to Ac1 transformation point, the similar cold rolled steel sheet as above can be obtained.

The above-described hot rolled steel sheet and cold rolled steel sheet can be treated by temper rolling aiming at shape correction and adjustment of surface roughness. In that case, the reduction rate is preferably regulated to 3.0% or less to avoid degradation of mechanical properties. The surface roughness of the steel sheet may be adjusted by controlling the surface roughness and the reduction rate of the rolls of temper rolling.

In the case that the steel sheet according to the present invention is manufactured under the above-described conditions, the steel as the base material is melt-prepared in, for example, converter or electric furnace. For manufacturing slab, ingot-making and rolling method, continuous casting method, thin slab casting method, and strip casting method may be applied.

The hot rolling may be conducted by a method with slab reheating followed by rolling, or by a direct rolling method with short time reheating after continuous casting or without reheating after continuous casting. Alternatively, the heating by a bar heater may be applied during the hot rolling stage. To attain homogeneous structure, the cooling may be applied at a speed of 200° C./sec or more within one second after the hot rolling.

To the hot rolled steel sheet or the cold rolled steel sheet according to the present invention, surface treatment (chemical treatment, hot dip galvanizing treatment, alloying treatment after dip galvanizing) may be applied, at need.

Figure 5:
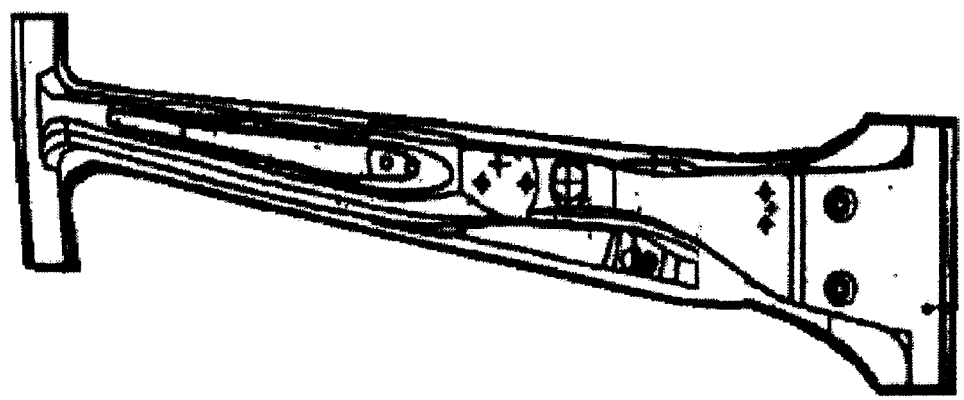
FIG. 5 is perspective view of an automotive center pillar formed from the steel sheet of the present invention.
Figure 6:
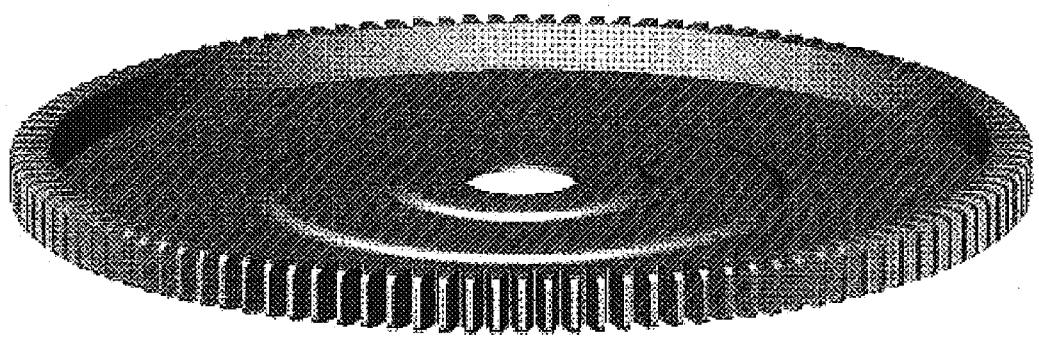
FIG. 6 is a perspective view of a gear part formed from the steel sheet of the present invention.

According to the steel sheet of the present invention, high strength of 980 MPa or more is attained by an inexpensive hardening treatment method, and excellent toughness can be obtained. Consequently, the steel sheet according to the present invention is suitable for the automobile components which are treated by hardening treatment after formed, particularly for the structural components such as door impact beams and center pillars (see FIG. 5) such as disclosed in the aforementioned MATERIA publication (see FIGS. 2 & 7 of MATERIA), and for the functional components such as gear parts (see FIG. 6) used in seat recliners and window regulators.

EXAMPLE 1

Steels having the composition given in Nos. 1 through 12 in Table 1 were prepared by melting, and then hot rolled or hot rolled followed by annealing, under the conditions shown in Table 2, to obtain hot rolled steel sheets having a thickness of 2.4 mm. Along lateral to the rolling direction of each of thus obtained steel sheets, JIS No. 5 specimens were sampled to conduct tensile test. The BN was observed using a transmission electron microscope, and the average particle size of BN was determined. The induction hardening treatment was given to the specimens using similar procedure as applied above, and the Charpy impact absorbed energy and the size of prior austenite grains were determined using similar procedure as applied above. Furthermore, the tensile test was conducted after the hardening treatment, using the similar procedure as applied above. The Charpy impact absorbed energy was determined using specimens prepared from hot rolled steel sheets which was ground to 1.2 mm of thickness, and the value of 0.4 kgm or more, which satisfies the conventional standard JSC980Y, was regarded as acceptable.

The test results are shown in Table 3.

For the steel sheets Nos. A, B, C, E, and G, having compositions, values of [14B/(10.8N)], and average particle size of BN and size of prior austenite grains within the range of the present invention, 980 MPa or higher tensile strength is attained after the hardening treatment, and stable Charpy impact absorbed energy as high as 0.4 kgm or more, or excellent toughness, is attained independent of the time to start cooling. In particular, for the steel sheets Nos. A, B, and C, having lower content of C, Si, Mn, P, and S, 0.03 to 0.07% sol.Al and 0.0010 to 0.0030% B, the Charpy impact absorbed energy of 0.5 kgm or more, or extremely superior toughness, is attained.

The steel sheet No. H containing smaller amount of C than the range of the present invention has low tensile strength. For the steel sheet No. I containing larger amount of C than the range of the present invention, the steel sheet No. J containing larger amount of Si and P than the range of the present invention, and the steel sheet No. K containing larger amount of Mn and S than the range of the present invention, the Charpy impact absorbed energy is low, thus failing in obtaining superior toughness. For the steel sheet No. L containing larger amount of sol.Al and N than the range of the present invention, the size of prior austenite grains is smaller than the range of the present invention, and, when the time to start cooling is delayed, the Charpy impact absorbed energy becomes small. For the steel No. M containing smaller amount of B than the range of the present invention and having average particle size of BN outside the range of the present invention, the size of prior austenitic grains is larger than the range of the present invention, or becomes coarse, thus degrading the toughness. The steel sheet No. N having smaller value of [14B/(10.8N)] than the range of the present invention gives low Charpy impact absorbed energy when the time to start cooling is delayed. For the steel sheet No. D coiled at higher temperature than the range of the present invention, the cementite is left undissolved during the hardening treatment, thus the Charpy impact absorbed energy becomes small. For the steel sheet No. F coiled at lower temperature than the range of the present invention, the average particle size of BN becomes smaller than the range of the present invention, and the size of prior austenite grains becomes larger than the range of the present invention, or becomes coarse, thus decreasing the Charpy impact absorbed energy.

TABLE 1

| Steel No. | C | Si | Mn | P | S | sol. Al | N | B | Others | 14B/(10.8N) | Remark |
|---|---|---|---|---|---|---|---|---|---|---|---|
| 1 | 0.16 | 0.02 | 0.80 | 0.015 | 0.012 | 0.045 | 0.0020 | 0.0026 | — | 1.70 | Example |
| 2 | 0.12 | 0.50 | 1.30 | 0.028 | 0.018 | 0.037 | 0.0023 | 0.0018 | 0.2Ni, 0.1Mo | 1.01 | Example |
| 3 | 0.29 | 0.01 | 0.50 | 0.009 | 0.004 | 0.066 | 0.0042 | 0.0030 | 0.2Cr | 0.93 | Example |
| 4 | 0.35 | 0.02 | 0.20 | 0.008 | 0.002 | 0.021 | 0.0011 | 0.0005 | 0.2Cr | 0.59 | Example |
| 5 | 0.18 | 0.01 | 0.70 | 0.070 | 0.024 | 0.090 | 0.0021 | 0.0024 | 0.02Nb | 1.48 | Example |
| 6 | 0.05* | 0.02 | 1.20 | 0.014 | 0.010 | 0.044 | 0.0022 | 0.0028 | — | 1.73 | Comparative example |
| 7 | 0.42* | 0.21 | 0.65 | 0.031 | 0.024 | 0.032 | 0.0025 | 0.0032 | 0.1Cr | 1.66 | Comparative example |
| 8 | 0.15 | 1.20* | 0.43 | 0.110* | 0.008 | 0.047 | 0.0018 | 0.0016 | — | 1.15 | Comparative example |
| 9 | 0.12 | 0.01 | 3.00* | 0.021 | 0.042* | 0.030 | 0.0015 | 0.0027 | 0.2Mo | 2.33 | Comparative example |
| 10 | 0.13 | 0.02 | 0.76 | 0.023 | 0.012 | 0.140* | 0.0064* | 0.0045 | — | 0.91 | Comparative example |
| 11 | 0.16 | 0.12 | 0.46 | 0.018 | 0.015 | 0.037 | 0.0005 | 0.0002* | — | 0.52 | Comparative example |
| 12 | 0.17 | 0.24 | 0.41 | 0.015 | 0.010 | 0.052 | 0.0031 | 0.0008 | — | 0.33* | Comparative example |

Unit is mass %
*Outside the range of the present invention

TABLE 2

| Steel sheet No. | Steel No. | Heating temperature (° C.) | Finishing temperature (° C.) | Intermediate temperature (° C.) | Coiling temperature (° C.) | Annealing condition |
|---|---|---|---|---|---|---|
| A | 1 | 1200 | 880 | 700 | 640 | — |
| B | 2 | 1200 | 900 | 700 | 640 | — |
| C | 3 | 1250 | 870 | 680 | 620 | 720° C. × 40 hr |
| D | 3 | 1250 | 870 | 780 | 740* | — |
| E | 4 | 1200 | 850 | 700 | 640 | 720° C. × 40 hr |
| F | 4 | 1200 | 850 | 570 | 480* | 720° C. × 40 hr |
| G | 5 | 1200 | 900 | 700 | 640 | — |
| H | 6 | 1200 | 900 | 720 | 660 | — |
| I | 7 | 1200 | 830 | 680 | 600 | 720° C. × 40 hr |
| J | 8 | 1100 | 900 | 700 | 640 | — |
| K | 9 | 1200 | 900 | 700 | 640 | — |
| L | 10 | 1250 | 900 | 700 | 640 | — |
| M | 11 | 1200 | 880 | 700 | 640 | — |
| N | 12 | 1200 | 880 | 700 | 640 | — |

*Outside the range of the present invention

TABLE 3

| | | Before hardening treatment | | After hardening treatment | | | | | |
|---|---|---|---|---|---|---|---|---|---|
| | | | | Time to start cooling: 0.5 sec. | | Time to start cooling: 3 sec. | | | |
| Steel sheet No. | Steel No. | Tensile strength (MPa) | BN average particle size (μm) | Tensile strength (MPa) | Charpy impact absorbed energy (kgm) | Tensile strength (MPa) | Charpy impact absorbed energy (kgm) | Size of prior austenite grains (μm) | Remark |
| A | 1 | 488 | 0.20 | 1470 | 0.58 | 1460 | 0.52 | 8.0 | Example |
| B | 2 | 463 | 0.24 | 1310 | 0.61 | 1260 | 0.62 | 12.1 | Example |
| C | 3 | 477 | 0.12 | 1590 | 0.51 | 1520 | 0.50 | 21.8 | Example |
| D | 3 | 438 | 0.29 | 1270 | 0.28 | 1130 | 0.20 | 8.4 | Comparative example |
| E | 4 | 442 | 0.21 | 1660 | 0.47 | 1590 | 0.46 | 8.5 | Example |
| F | 4 | 512 | 0.07* | 1320 | 0.24 | 1200 | 0.21 | 29.2* | Comparative example |
| G | 5 | 476 | 0.15 | 1080 | 0.43 | 1030 | 0.42 | 3.2 | Example |
| H | 6 | 359 | 0.24 | 840 | 0.74 | 760 | 0.66 | 6.2 | Comparative example |
| I | 7 | 564 | 0.23 | 1890 | 0.11 | 1810 | 0.13 | 9.6 | Comparative example |
| J | 8 | 483 | 0.28 | 1490 | 0.10 | 1370 | 0.07 | 10.2 | Comparative example |
| K | 9 | 508 | 0.18 | 1380 | 0.13 | 1270 | 0.08 | 4.4 | Comparative example |
| L | 10 | 475 | 0.33 | 1410 | 0.42 | 1030 | 0.10 | 0.8* | Comparative example |
| M | 11 | 456 | 0.04* | 1120 | 0.23 | 1060 | 0.15 | 37.2* | Comparative example |
| N | 12 | 468 | 0.11 | 1370 | 0.46 | 1130 | 0.12 | 23.3 | Comparative example |

*Outside the range of the present invention

EXAMPLE 2

Steels having the composition given in Nos. 1 through 12 in Table 1 were used. These steel sheets were hot rolled or hot rolled followed by primary annealing, under the conditions shown in Table 4, and then cold rolled at a reduction rate of 50%, further subjected to final annealing under the conditions given in Table 4. The obtained cold rolled steel sheets had a thickness of 1.2 mm. After the final annealing, temper rolling was applied to the steel sheets to give 0.8±0.1 μm of Ra and 6.4±0.1 μm of Ry. To these steels, tests similar with those in Example 1 were applied.

The test results are given in Table 5.

Similar with the hot rolled steel sheets of Example 1, the steel sheets Nos. a, c, d, e, and h, having the composition, the value of [14B/(10.8N)], the average particle size of BN, and the size of prior austenite grains, within the range of the present invention have 980 MPa or higher tensile strength after the hardening treatment, and stable Charpy impact absorbed energy of 0.5 kgm or more, or excellent toughness, independent of the time to start cooling. Particularly for the steel sheets Nos. a, c, and d, containing small amount of C, Si, Mn, P, and S, 0.03 to 0.07% sol.Al and 0.0010 to 0.0030% B, the Charpy impact absorbed energy is 0.5 kgm or more, or extremely superior toughness.

For the steel sheets No. b and g, coiled at low temperature and having smaller average particle size of BN than the range of the present invention, the size of prior austenite grains is larger than the range of the present invention, and, when the time to start cooling is delayed, the Charpy impact absorbed energy becomes low, thus failing in attaining excellent toughness. For the steel sheet No. i containing smaller amount of C than the range of the present invention, the tensile strength is low. The steel sheet No. j containing larger amount of C than the range of the present invention, the steel sheet No. k containing larger amount of Si and P than the range of the present invention, and the steel sheet No. 1 containing larger amount of Mn and S than the range of the present invention, give low Charpy impact absorbed energy. For the steel sheet No. m containing larger amount of sol.Al and N than the range of the present invention, the size of prior austenite grains is smaller than the range of the present invention, and, when the time to start cooling is delayed, the Charpy impact absorbed energy becomes low. For the steel sheet No. n containing smaller amount of B than the range of the present invention and having average particle size of BN outside the range of the present invention, the size of austenite grains becomes larger than the range of the present invention, or becomes coarse, thus degrading the toughness. For the steel sheet No. o, having smaller value of [14B/(10.8N)] than the range of the present invention, the Charpy impact absorbed energy becomes low when the time to start cooling is delayed. For the steel sheet No. f coiled at higher temperature than the range of the present invention, the cementite is left undissolved during the hardening treatment, and the Charpy impact absorbed energy becomes low.

TABLE 4

| Steel sheet No. | Steel No. | Heating temperature (° C.) | Finishing temperature (° C.) | Intermediate temperature (° C.) | Coiling temperature (° C.) | Primary annealing condition | Final annealing condition |
|---|---|---|---|---|---|---|---|
| a | 1 | 1200 | 880 | 700 | 640 | — | 720° C. × 2 min |
| b | 1 | 1200 | 880 | 550 | 450 | — | 720° C. × 2 min |
| c | 2 | 1200 | 900 | 700 | 620 | — | 720° C. × 2 min |
| d | 3 | 1250 | 870 | 680 | 620 | — | 680° C. × 20 hr |
| e | 4 | 1250 | 870 | 700 | 640 | 680° C. × 40 hr | 680° C. × 20 hr |
| f | 4 | 1200 | 850 | 780 | 740* | — | 720° C. × 40 hr |
| g | 4 | 1200 | 850 | 560 | 470* | 720° C. × 40 hr | 720° C. × 40 hr |
| h | 5 | 1200 | 900 | 700 | 640 | — | 720° C. × 2 min |
| i | 6 | 1200 | 900 | 720 | 660 | — | 720° C. × 2 min |
| j | 7 | 1200 | 830 | 660 | 600 | 720° C. × 40 hr | 720° C. × 40 hr |
| k | 8 | 1100 | 900 | 700 | 640 | — | 720° C. × 2 min |
| l | 9 | 1200 | 900 | 700 | 640 | — | 720° C. × 2 min |
| m | 10 | 1250 | 900 | 700 | 640 | — | 720° C. × 2 min |
| n | 11 | 1200 | 880 | 700 | 640 | — | 720° C. × 2 min |
| o | 12 | 1200 | 880 | 700 | 640 | — | 720° C. × 2 min |

*Outside the range of the present invention

TABLE 5

| | | Before hardening treatment | | After hardening treatment | | | | | |
|---|---|---|---|---|---|---|---|---|---|
| | | | | Time to start cooling: 0.5 sec. | | Time to start cooling: 3 sec. | | | |
| Steel sheet No. | Steel No. | Tensile strength (MPa) | BN average particle size (μm) | Tensile strength (MPa) | Charpy impact absorbed energy (kgm) | Tensile strength (MPa) | Charpy impact absorbed energy (kgm) | Size of prior austenite grains (μm) | Remark |
| a | 1 | 446 | 0.22 | 1490 | 0.55 | 1470 | 0.51 | 8.3 | Example |
| b | 1 | 495 | 0.05* | 1530 | 0.26 | 1530 | 0.22 | 32.0* | Comparative example |
| c | 2 | 452 | 0.27 | 1310 | 0.65 | 1250 | 0.64 | 11.9 | Example |
| d | 3 | 432 | 0.14 | 1580 | 0.52 | 1530 | 0.50 | 19.7 | Example |
| e | 4 | 458 | 0.20 | 1680 | 0.45 | 1630 | 0.42 | 9.4 | Example |
| f | 4 | 521 | 0.23 | 1390 | 0.29 | 1270 | 0.22 | 2.8 | Comparative example |
| g | 4 | 515 | 0.07* | 1420 | 0.27 | 1300 | 0.19 | 30.3* | Comparative example |
| h | 5 | 461 | 0.16 | 1060 | 0.42 | 1020 | 0.42 | 2.8 | Example |
| i | 6 | 347 | 0.25 | 860 | 0.73 | 790 | 0.67 | 6.7 | Comparative example |
| j | 7 | 552 | 0.22 | 1880 | 0.13 | 1780 | 0.12 | 8.9 | Comparative example |
| k | 8 | 483 | 0.27 | 1520 | 0.08 | 1480 | 0.05 | 9.2 | Comparative example |
| l | 9 | 498 | 0.19 | 1390 | 0.11 | 1280 | 0.09 | 4.7 | Comparative example |
| m | 10 | 460 | 0.31 | 1440 | 0.43 | 1120 | 0.12 | 0.9* | Comparative example |
| n | 11 | 442 | 0.03* | 1110 | 0.21 | 1080 | 0.17 | 36.0* | Comparative example |
| o | 12 | 456 | 0.12 | 1340 | 0.47 | 1150 | 0.13 | 23.3 | Comparative example |

*Outside the range of the present invention

EXAMPLE 3

Steels having the composition given in Nos. 1 through 13 in Table 6 were prepared by melting and then hot rolled or hot rolled followed by annealing, under the conditions given in Table 7, to obtain hot rolled steel sheets having a thickness of 2.4 mm. To these steels, tests similar with those in Example 1 were applied. Since, however, Ti was added to all the steel sheets, TiN was observed under the transmission electron microscope.

The test results are given in Table 8.

The steel sheets Nos. A, B, C, E, and G, having the composition, the value of [B−(10.8/14)N*], the average particle size of TiN, and the size of prior austenite grains, within the range of the present invention, give 980 MPa or higher tensile strength after the hardening treatment, and stable Charpy impact absorbed energy of 0.4 kgm or more, or excellent toughness, independent of the time to start cooling. Particularly for the steel sheets Nos. A, B, and C, containing small amount of C, Si, Mn, P, and S, 0.03 to 0.07% sol.Al and 0.0005 to 0.0020% B, the Charpy impact absorbed energy is 0.5 kgm or more, or extremely superior toughness is attained.

For the steel sheet No. H containing smaller amount of C than the range of the present invention, the tensile strength is low. For the steel sheet No. I containing larger amount of C than the range of the present invention, the steel sheet J containing larger amount of Si and P than the range of the present invention, and the steel sheet No. K containing larger amount of Mn and S than the range of the present invention, the Charpy impact absorbed energy becomes low, thus failing in attaining excellent toughness. For the steel sheet L containing larger amount of sol.Al and N than the range of the present invention, the size of prior austenite grains is smaller than the range of the present invention, and, when the time to start cooling is delayed, the Charpy impact absorbed energy becomes low. For the steel sheet No. M containing smaller amount of B than the range of the present invention, and having the value of [B−(10.8/14)N*] outside the range of the present invention, when the time to start cooling is delayed, the ferrite grains are formed to degrade the toughness. For the steel sheet No. N containing smaller amount of Ti than the range of the present invention, having smaller average particle size of TiN than the range of the present invention, and having the value of [B−(10.8/14)N*] outside the range of the present invention, the prior austenite grains becomes coarse, and the Charpy impact absorbed energy becomes low. For the steel sheet No. O containing larger amount of Ti than the range of the present invention, and having larger average particle size of TiN than the range of the present invention, the size of prior austenite grains is smaller than the range of the present invention, and the Charpy impact absorbed energy becomes low. For the steel sheet No. D coiled at higher temperature than the range of the present invention, the cementite is left undissolved during the hardening treatment, and the Charpy impact absorbed energy becomes low. For the steel No. F coiled at lower temperature than the range of the present invention, the average particle size of TiN is smaller than the range of the present invention, and the size of prior austenite grains is smaller than the range of the present invention, so, when the time to start cooling is delayed, the Charpy impact absorbed energy becomes low.

TABLE 6

| Steel No. | C | Si | Mn | P | S | Sol. Al | N | Ti | B | Others | B−(10.8/14)N* | Remark |
|---|---|---|---|---|---|---|---|---|---|---|---|---|
| 1 | 0.15 | 0.01 | 0.90 | 0.020 | 0.015 | 0.035 | 0.0026 | 0.016 | 0.0016 | — | 0.0016 | Example |
| 2 | 0.11 | 0.45 | 1.40 | 0.015 | 0.008 | 0.057 | 0.0034 | 0.011 | 0.0020 | 0.5Ni, 0.1Mo | 0.0019 | Example |
| 3 | 0.29 | 0.02 | 0.55 | 0.008 | 0.003 | 0.028 | 0.0014 | 0.032 | 0.0005 | 0.1Cr | 0.0005 | Example |
| 4 | 0.34 | 0.01 | 0.20 | 0.023 | 0.012 | 0.043 | 0.0038 | 0.010 | 0.0034 | 0.2Cr | 0.0027 | Example |
| 5 | 0.17 | 0.02 | 0.55 | 0.068 | 0.022 | 0.088 | 0.0019 | 0.006 | 0.0013 | 0.02Nb | 0.0012 | Example |
| 6 | 0.06** | 0.01 | 1.00 | 0.012 | 0.007 | 0.035 | 0.0024 | 0.010 | 0.0022 | — | 0.0022 | Comparative example |
| 7 | 0.41** | 0.18 | 0.72 | 0.016 | 0.006 | 0.038 | 0.0021 | 0.014 | 0.0020 | 0.15Cr | 0.0020 | Comparative example |
| 8 | 0.16 | 1.30** | 0.40 | 0.121** | 0.009 | 0.027 | 0.0017 | 0.008 | 0.0012 | — | 0.0012 | Comparative example |
| 9 | 0.11 | 0.02 | 2.70** | 0.018 | 0.040** | 0.034 | 0.0032 | 0.013 | 0.0018 | 0.2Mo | 0.0018 | Comparative example |
| 10 | 0.17 | 0.01 | 0.85 | 0.021 | 0.023 | 0.120** | 0.0058** | 0.012 | 0.0048 | — | 0.0030 | Comparative example |
| 11 | 0.14 | 0.14 | 0.55 | 0.012 | 0.009 | 0.022 | 0.0012 | 0.015 | 0.0002** | — | 0.0002** | Comparative example |
| 12 | 0.20 | 0.18 | 0.45 | 0.017 | 0.011 | 0.064 | 0.0033 | 0.002** | 0.0007 | — | 0** | Comparative example |
| 13 | 0.15 | 0.01 | 0.87 | 0.018 | 0.012 | 0.033 | 0.0031 | 0.067** | 0.0017 | — | 0.0017 | Comparative example |

Unit is mass %
**Outside the range of the present invention

TABLE 7

| Steel sheet No. | Steel No. | Heating temperature (° C.) | Finishing temperature (° C.) | Intermediate temperature (° C.) | Coiling temperature (° C.) | Annealing condition |
|---|---|---|---|---|---|---|
| A | 1 | 1200 | 880 | 690 | 620 | — |
| B | 2 | 1200 | 900 | 690 | 620 | — |
| C | 3 | 1250 | 870 | 690 | 610 | 720° C. × 40 hr |
| D | 3 | 1250 | 870 | 780 | 740* | 680° C. × 20 hr |
| E | 4 | 1200 | 850 | 690 | 620 | 720° C. × 40 hr |
| F | 4 | 1200 | 850 | 600 | 490* | 720° C. × 40 hr |
| G | 5 | 1200 | 900 | 690 | 620 | — |
| H | 6 | 1200 | 900 | 720 | 660 | — |
| I | 7 | 1200 | 830 | 660 | 600 | 720° C. × 40 hr |
| J | 8 | 1250 | 900 | 690 | 620 | — |
| K | 9 | 1200 | 900 | 690 | 620 | — |
| L | 10 | 1250 | 900 | 690 | 620 | — |
| M | 11 | 1200 | 880 | 690 | 620 | — |
| N | 12 | 1200 | 880 | 690 | 620 | 680° C. × 20 hr |
| O | 13 | 1200 | 880 | 690 | 620 | — |

*Outside the range of the present invention

TABLE 8

| Steel sheet No. | Steel No. | Before hardening treatment | | After hardening treatment | | | | | Remark |
|---|---|---|---|---|---|---|---|---|---|
| | | Tensile strength (MPa) | BN average particle size (μm) | Time to start cooling: 0.5 sec. | | Time to start cooling: 3 sec. | | Size of prior austenite grains (μm) | |
| | | | | Tensile strength (MPa) | Charpy impact absorbed energy (kgm) | Tensile strength (MPa) | Charpy impact absorbed energy (kgm) | | |
| A | 1 | 475 | 0.15 | 1440 | 0.55 | 1420 | 0.53 | 6.8 | Example |
| B | 2 | 469 | 0.12 | 1250 | 0.65 | 1200 | 0.64 | 11.3 | Example |
| C | 3 | 447 | 0.25 | 1580 | 0.53 | 1510 | 0.52 | 18.3 | Example |
| D | 3 | 432 | 0.18 | 1060 | 0.34 | 870 | 0.26 | 4.4 | Comparative example |
| E | 4 | 434 | 0.15 | 1680 | 0.41 | 1650 | 0.40 | 8.4 | Example |
| F | 4 | 508 | 0.05* | 1460 | 0.37 | 1320 | 0.18 | 1.4* | Comparative example |
| G | 5 | 463 | 0.09 | 1340 | 0.47 | 1270 | 0.41 | 2.7 | Example |
| H | 6 | 371 | 0.15 | 860 | 0.74 | 780 | 0.67 | 6.1 | Comparative example |
| I | 7 | 558 | 0.22 | 1840 | 0.14 | 1810 | 0.13 | 8.2 | Comparative example |
| J | 8 | 462 | 0.08 | 1520 | 0.12 | 1480 | 0.05 | 3.2 | Comparative example |
| K | 9 | 493 | 0.22 | 1320 | 0.15 | 1240 | 0.07 | 5.6 | Comparative example |
| L | 10 | 465 | 0.21 | 1540 | 0.47 | 1060 | 0.16 | 1.0* | Comparative example |
| M | 11 | 448 | 0.25 | 1490 | 0.55 | 1110 | 0.13 | 5.9 | Comparative example |
| N | 12 | 441 | 0.04* | 1580 | 0.23 | 1530 | 0.15 | 34.1* | Comparative example |
| O | 13 | 467 | 0.84* | 1300 | 0.43 | 870 | 0.15 | 0.9* | Comparative example |

*Outside the range of the present invention

EXAMPLE 4

Steels having the composition given in Nos. 1 through 13 in Table 6 were hot rolled or hot rolled followed by primary annealing, under the conditions shown in Table 9, and then cold rolled at a reduction rate of 50%, further subjected to final annealing under the conditions given in Table 9. The obtained cold rolled steel sheets had a thickness of 1.2 mm. After the final annealing, temper rolling was applied to the steel sheets to give 0.8±0.1 μm of Ra and 6.4±0.1 μm of Ry. To these steels, tests similar with those in Example 3 were applied.

The test results are given in Table 10.

Similar with the case of hot rolled steel sheets in Example 3, for the steel sheets Nos. a, c, d, e, and h, having the composition, the value of [B−(10.8/14)N*], the average particle size of TiN, and the size of prior austenite grains, within the range of the present invention, 980 MPa or higher tensile strength is attained after the hardening treatment, and 0.4 kgm or higher Charpy impact absorbed energy, or excellent toughness, is attained stably independent of the time to start cooling. Particularly for the steel sheets Nos. a, c, and d, containing small amount of C, Si, Mn, P, and S, 0.03 to 0.07% sol.Al and 0.0005 to 0.0020% B, the Charpy impact absorbed energy is 0.5 kgm or more, thus giving extremely superior toughness.

For the steel sheets Nos. b and g, coiled at low temperature and having smaller average particle size of TiN than the range of the present invention, the size of austenite grains becomes smaller than the range of the present invention, and, when the time to start cooling is delayed, the Charpy impact absorbed energy becomes low, thus failing in attaining excellent toughness. For the steel sheet No. i containing smaller amount of C than the range of the present invention, the tensile strength is low. For the steel sheet No. j containing larger amount of C than the range of the present invention, the steel sheet No. k containing larger amount of Si and P than the range of the present invention, and the steel sheet No. 1 containing larger amount of Mn and S than the range of the present invention, the Charpy impact absorbed energy becomes low. For the steel sheet No. m containing larger amount of sol.Al and N than the range of the present invention, the size of prior austenite grains becomes smaller than the range of the present invention, and, when the time to start cooling is delayed, the Charpy impact absorbed energy becomes low. For the steel sheet No. n containing smaller amount of B than the range of the present invention and having the value of [B−(10.8/14)N*] outside the range of the present invention, when the time to start cooling is delayed, the ferrite grains are formed to degrade the toughness. For the steel sheet No. o containing smaller amount of Ti than the range of the present invention, having smaller average particle size of TiN than the range of the present invention, and having the value of [B−(10.8/14)N*] outside the range of the present invention, the prior austenite grains becomes coarse, and the Charpy impact absorbed energy becomes low. For the steel sheet No. p containing larger amount of Ti and having larger average particle size of TiN than the range of the present invention, the size of prior austenite grains becomes smaller than the range of the present invention, and the Charpy impact absorbed energy becomes low. For the steel sheet No. f coiled at higher temperature than the range of the present invention, the cementite is left undissolved during the hardening treatment, and the Charpy impact absorbed energy becomes low.

TABLE 9

| Steel sheet No. | Steel No. | Heating temperature (° C.) | Finishing temperature (° C.) | Intermediate temperature (° C.) | Coiling temperature (° C.) | Primary annealing condition | Final annealing condition |
|---|---|---|---|---|---|---|---|
| a | 1 | 1200 | 880 | 690 | 620 | — | 720° C. × 2 min |
| b | 1 | 1300 | 880 | 570 | 480 | — | 720° C. × 2 min |
| c | 2 | 1200 | 900 | 690 | 620 | — | 720° C. × 2 min |
| d | 3 | 1250 | 870 | 690 | 610 | — | 680° C. × 20 hr |
| e | 4 | 1200 | 850 | 690 | 620 | 680° C. × 40 hr | 680° C. × 40 hr |
| f | 4 | 1200 | 850 | 780 | 740* | — | 720° C. × 40 hr |
| g | 4 | 1200 | 850 | 580 | 490* | 680° C. × 40 hr | 720° C. × 40 hr |
| h | 5 | 1200 | 900 | 690 | 620 | — | 720° C. × 2 min |
| i | 6 | 1200 | 900 | 720 | 660 | — | 720° C. × 2 min |
| j | 7 | 1200 | 830 | 660 | 600 | 720° C. × 40 hr | 720° C. × 40 hr |
| k | 8 | 1250 | 900 | 690 | 620 | — | 720° C. × 2 min |
| l | 9 | 1200 | 900 | 690 | 620 | — | 720° C. × 2 min |
| m | 10 | 1250 | 900 | 690 | 620 | — | 720° C. × 2 min |
| n | 11 | 1200 | 880 | 690 | 620 | — | 720° C. × 2 min |
| o | 12 | 1200 | 880 | 690 | 620 | 680° C. × 20 hr | 680° C. × 40 hr |
| p | 13 | 1200 | 880 | 690 | 620 | — | 720° C. × 2 min |

*Outside the range of the present invention

TABLE 10

| | | Before hardening treatment | | After hardening treatment | | | | | |
|---|---|---|---|---|---|---|---|---|---|
| | | | | Time to start cooling: 0.5 sec. | | Time to start cooling: 3 sec. | | | |
| Steel sheet No. | Steel No. | Tensile strength (MPa) | TiN average particle size (μm) | Tensile strength (MPa) | Charpy impact absorbed energy (kgm) | Tensile strength (MPa) | Charpy impact absorbed energy (kgm) | Size of prior austenite grains (μm) | Remark |
| a | 1 | 437 | 0.16 | 1470 | 0.57 | 1430 | 0.54 | 6.9 | Example |
| b | 1 | 458 | 0.05* | 1520 | 0.52 | 1480 | 0.25 | 1.2* | Comparative example |
| c | 2 | 457 | 0.14 | 1250 | 0.68 | 1210 | 0.65 | 11.8 | Example |
| d | 3 | 434 | 0.23 | 1590 | 0.52 | 1530 | 0.50 | 21.5 | Example |
| e | 4 | 447 | 0.17 | 1700 | 0.41 | 1680 | 0.40 | 9.1 | Example |
| f | 4 | 516 | 0.15 | 1420 | 0.30 | 1300 | 0.21 | 3.2 | Comparative example |
| g | 4 | 510 | 0.04* | 1440 | 0.38 | 1320 | 0.20 | 1.3* | Comparative example |
| h | 5 | 442 | 0.08 | 1360 | 0.46 | 1250 | 0.40 | 3.0 | Example |
| i | 6 | 348 | 0.14 | 840 | 0.77 | 770 | 0.69 | 6.4 | Comparative example |
| j | 7 | 531 | 0.24 | 1910 | 0.11 | 1880 | 0.08 | 12.7 | Comparative example |
| k | 8 | 443 | 0.09 | 1510 | 0.13 | 1470 | 0.06 | 4.4 | Comparative example |
| l | 9 | 479 | 0.20 | 1340 | 0.14 | 1230 | 0.07 | 6.5 | Comparative example |
| m | 10 | 452 | 0.22 | 1530 | 0.49 | 1070 | 0.15 | 1.2* | Comparative example |
| n | 11 | 433 | 0.24 | 1470 | 0.56 | 1090 | 0.14 | 6.1 | Comparative example |
| o | 12 | 432 | 0.05* | 1560 | 0.24 | 1540 | 0.17 | 35.2* | Comparative example |
| p | 13 | 452 | 0.78* | 1290 | 0.41 | 860 | 0.16 | 0.7* | Comparative example |

*Outside the range of the present invention

What is claimed:

1. A steel sheet consisting essentially of 0.10 to 0.37% C, 1% or less Si, 2.5% or less Mn, 0.1% or less P, 0.03% or less S, 0.01 to 0.1% sol.Al, 0.0005 to 0.0050% N, 0.0003 to 0.0050% B, by mass, and balance of Fe, [14B/(10.8N)] being 0.5 or more, average particle size of precipitate BN being 0.1 μm or more, and grain size of prior austenite after hardening treatment being 2 to 25 μm.

2. A steel sheet consisting essentially of 0.10 to 0.37% C, 1% or less Si, 2.5% or less Mn, 0.1% or less P, 0.03% or less S, 0.01 to 0.1% sol.Al, 0.0005 to 0.0050% N, 0.005 to 0.05% Ti, 0.0003 to 0.0050% B, by mass, and balance of Fe, [B−(10.8/14)N*] being not less than 0.0005%, average particle size of precipitate TiN being 0.06 to 0.30μm, grain size of prior austenite after hardening treatment being 2 to 25 μm, N* being zero for negative N* values calculated in a definition formula of N*=[N−(14/48)Ti].

3. The steel sheet according to claim 1, wherein the carbon content is 0.15 to 0.30% by mass.

4. The steel sheet according to claim 2, wherein the carbon content is 0.15 to 0.30% by mass.

5. The steel sheet according to claim 1, further containing 0.05 to 0.30% Cr by mass.

6. The steel sheet according to claim 2, further containing 0.05 to 0.30% Cr by mass.

7. The steel sheet according to claim 1, further containing 1% or less, by mass, of at least one element selected from the group consisting of Ni and Mo.

8. The steel sheet according to claim 2, further containing 1% or less, by mass, of at least one element selected from the group consisting of Ni and Mo.

9. A method for manufacturing a steel sheet, comprising the steps of:
hot rolling a steel slab consisting essentially of 0.10 to 0.37% C, 1% or less Si, 2.5% or less Mn, 0.1% or less P, 0.03% or less S, 0.01 to 0.1% sol.Al, 0.0005 to 0.0050% N, 0.0003 to 0.0050% B, by mass, and balance of Fe, [14B/(10.8N)] being 0.5 or more, at temperatures of Ar3 transformation point or above; and
coiling the hot rolled steel sheet at temperatures of from 500 to 720° C.

10. A method for manufacturing a steel sheet, comprising the steps of:
hot rolling a steel slab consisting essentially of 0.10 to 0.37% C, 1% or less Si, 2.5% or less Mn, 0.1% or less P, 0.03% or less S, 0.01 to 0.1% sol.Al, 0.0005 to 0.0050% N, 0.0003 to 0.0050% B, 0.05 to 0.30% Cr, by mass, and balance of Fe, [14B/(10.8N)] being 0.5 or more, at temperatures of Ar3 transformation point or above; and
coiling the hot rolled steel sheet at temperatures of from 500 to 720° C.

11. A method for manufacturing a steel sheet, comprising the steps of:
hot rolling a steel slab consisting essentially of 0.10 to 0.37% C, 1% or less Si, 2.5% or less Mn, 0.1% or less P, 0.03% or less S, 0.01 to 0.1% sol.Al, 0.0005 to 0.0050% N, 0.005 to 0.05% Ti, 0.0003 to 0.0050% B, by mass, and balance of Fe, [B−(10.8/14)N*] being not less than 0.0005%, at temperatures of Ar3 transformation point or above; and
coiling the hot rolled steel sheet at temperatures of from 500 to 720° C., N* being zero for negative N* values calculated in a definition formula of N*=[N−(14/48)Ti].

12. A method for manufacturing a steel sheet, comprising the steps of:
hot rolling a steel slab consisting essentially of 0.10 to 0.37% C, 1% or less Si, 2.5% or less Mn, 0.1% or less P, 0.03% or less S, 0.01 to 0.1% sol.Al, 0.0005 to 0.0050% N, 0.005 to 0.05% Ti, 0.0003 to 0.0050% B, 0.05 to 0.30% Cr, by mass, and balance of Fe, [B−(10.8/14)N*] being not less than 0.0005%, at temperatures of Ar3 transformation point or above; and
coiling the hot rolled steel sheet at temperatures of from 500 to 720° C., N* being zero for negative N* values calculated in a definition formula of N*=[N−(14/48)Ti].

13. The method for manufacturing a steel sheet according to claim 9, further comprising the steps of:
pickling the steel sheet; and
annealing the pickled steel sheet at temperatures of from 640° C. to Ac1 transformation point.

14. The method for manufacturing a steel sheet according to claim 10, further comprising the steps of:
pickling the steel sheet; and
annealing the pickled steel sheet at temperatures of from 640° C. to Ac1 transformation point.

15. The method for manufacturing a steel sheet according to claim 11, further comprising the steps of:
pickling the steel sheet; and
annealing the pickled steel sheet at temperatures of from 640° C. to Ac1 transformation point.

16. The method for manufacturing a steel sheet according to claim 12, further comprising the steps of:
pickling the steel sheet; and
annealing the pickled steel sheet at temperatures of from 640° C. to Ac1 transformation point.

17. The method for manufacturing a steel sheet according to claim 9, further comprising the steps of:
pickling the steel sheet;
cold rolling the pickled steel sheet at a reduction rate of 30% or more; and
annealing the cold rolled steel sheet at temperatures of from 600° C. to Ac1 transformation point.

18. The method for manufacturing a steel sheet according to claim 10, further comprising the steps of:
pickling the steel sheet;
cold rolling the pickled steel sheet at a reduction rate of 30% or more; and
annealing the cold rolled steel sheet at temperatures of from 600° C. to Ac1 transformation point.

19. The method for manufacturing a steel sheet according to claim 11, further comprising the steps of:
pickling the steel sheet;
cold rolling the pickled steel sheet at a reduction rate of 30% or more; and
annealing the cold rolled steel sheet at temperatures of from 600° C. to Ac1 transformation point.

20. The method for manufacturing a steel sheet according to claim 12, further comprising the steps of:
pickling the steel sheet;
cold rolling the pickled steel sheet at a reduction rate of 30% or more; and
annealing the cold rolled steel sheet at temperatures of from 600° C. to Ac1 transformation point.

21. An automobile component made of the steel sheet according to claim 1.

22. An automobile component made of the steel sheet according to claim 2.

23. An automobile component made of the steel sheet according to claim 5.

24. An automobile component made of the steel sheet according to claim 6.

* * * * *